(12) United States Patent
Turovets et al.

(10) Patent No.: US 12,498,332 B2
(45) Date of Patent: Dec. 16, 2025

(54) IMAGING METROLOGY

(71) Applicant: NOVA LTD., Rehovot (IL)

(72) Inventors: Igor Turovets, Rehovot (IL); Shimon Yalov, Rehovot (IL); Alex Shichtman, Rehovot (IL); Misha Matusovsky, Rehovot (IL); Shachar Paz, Rehovot (IL)

(73) Assignee: NOVA LTD., Rehovot (IL)

( * ) Notice: Subject to any disclaimer, the term of this patent is extended or adjusted under 35 U.S.C. 154(b) by 0 days.

(21) Appl. No.: 18/043,331

(22) PCT Filed: Aug. 27, 2021

(86) PCT No.: PCT/IB2021/057862
§ 371 (c)(1),
(2) Date: Feb. 27, 2023

(87) PCT Pub. No.: WO2022/043935
PCT Pub. Date: Mar. 3, 2022

(65) Prior Publication Data
US 2023/0280283 A1    Sep. 7, 2023

Related U.S. Application Data

(60) Provisional application No. 63/071,343, filed on Aug. 27, 2020.

(51) Int. Cl.
*G01N 21/95* (2006.01)
*G01N 35/00* (2006.01)
*G06N 20/00* (2019.01)

(52) U.S. Cl.
CPC ..... *G01N 21/9501* (2013.01); *G01N 35/0099* (2013.01); *G06N 20/00* (2019.01)

(58) Field of Classification Search
CPC .......... G01N 21/9501; G01N 35/0099; G01N 2021/8883; G01N 21/95684; G06N 20/00;
(Continued)

(56) References Cited

U.S. PATENT DOCUMENTS 9,470,639 B1 * 10/2016 Zhuang ................ G01N 21/211
9,846,122 B2 * 12/2017 Buczkowski ......... G01J 3/2823
(Continued)

FOREIGN PATENT DOCUMENTS

CN      109475293 A     3/2019
JP      H05136236 A     6/1993
(Continued)

OTHER PUBLICATIONS

May 27, 2025 Official Action in JP 2023-513607.
Aug. 2, 2025 Chinese Official Action, issued in CN202180073458.8.

*Primary Examiner* — Hung V Nguyen
(74) *Attorney, Agent, or Firm* — Reches Patents

(57) ABSTRACT

A method for optical metrology of a sample, the method may include illuminating areas of the sample by sets of pulses of different wavelengths, during a movement of a variable speed of the sample; collecting light reflected from the sample, as a result of the illuminating, to provide sets of frames, each set of frames comprises partially overlapping frames associated with the different wavelengths; and processing the frames to provide optical metrology results indicative of one or more evaluated parameters of elements of the areas of the sample; wherein the processing is based on a mapping between the sets of frames and reference measurements obtained by an other optical metrology process that exhibits a higher spectral resolution than a spectral resolution obtained by the illuminating and the collecting.

19 Claims, 17 Drawing Sheets

(58) Field of Classification Search
CPC .... G01Q 30/20; G01B 2210/56; G01B 11/02; G03F 7/70625; H01L 22/12
See application file for complete search history.

(56) References Cited

U.S. PATENT DOCUMENTS

| | | | |
|---|---|---|---|
| 9,879,977 B2* | 1/2018 | Shchegrov | G01B 11/02 |
| 10,181,185 B2* | 1/2019 | Park | G06T 7/001 |
| 2004/0258514 A1 | 12/2004 | Raaijmakers | |
| 2005/0264806 A1* | 12/2005 | Borden | G01N 21/55 |
| | | | 356/326 |
| 2006/0012780 A1 | 1/2006 | Nishiyama et al. | |
| 2017/0168282 A1 | 6/2017 | Lawson et al. | |
| 2018/0059137 A1* | 3/2018 | Prater | G01Q 30/02 |
| 2018/0328868 A1 | 11/2018 | Bykanov et al. | |
| 2019/0331608 A1 | 10/2019 | Terasawa et al. | |

FOREIGN PATENT DOCUMENTS

| | | |
|---|---|---|
| JP | 2006029881 A | 2/2006 |
| JP | 2016050944 A | 4/2016 |
| JP | 2017167152 A | 11/2018 |
| JP | 2019190978 A | 4/2020 |
| WO | 2009032681 A1 | 3/2009 |
| WO | WO2009/032681 | 3/2009 |

* cited by examiner

IMAGING METROLOGY

BACKGROUND

Optical metrology for semiconductor devices is a standard way to measure critical dimensions on the semiconductor wafer to promote high yield during semiconductor manufacturing process. A number of optical metrology-based techniques such as spectral reflectometry, scatterometry, ellipsometry, and spectral ellipsometry, etc. are commonly used to detect critical dimensions, film thickness, composition and other parameters of the semiconductor wafers during its manufacturing.

White light reflectometry, scatterometry and ellipsometry are relatively time consuming techniques as they require to obtain spectral information at hundreds and even thousands of wavelengths and to process said information. This why the measuring is performed on selected sites, which may form a negligible part of the wafer.

The measuring site size for such techniques is typically less than 100 um, the measurements are done by sequential way site by site and only very limited points of measurements could be performed without serious implication on the throughput of the metrology system.

Hyperspectral imaging is a known optical metrology method. A tested wafer is illuminated by a broad light spectrum and generated image data represent the light intensity reflected or scattered from the tested wafer. The detected image pixels are analyzed separately for various spectral ranges. Hyperspectral imaging is costly and complex. It required fast computers, highly sensitive detectors, and large data storage resources for analyzing hyperspectral data.

Scatterometry tools are widely used in the process control of semiconductor manufacturing. Scatterometry tools are usually measuring reflected spectra at certain test sites, and/or memory arrays, and/or other predefined in-die locations. The size of the area on the sample that is being measured—the area that returns (reflects) light that is being detected—or spot size, is usually small in the range of about 10-50 microns in diameter.

Scatterometry tools are fast: MAM time can be well below second, and usually TPT time is above 100 w/hour for a standard sampling plan. Increasing sampling plans will require more sites to be measured, but in any case, with small spot size measurement of large areas for WID and/or WIW uniformity may be problematic, and/or if spatial wafer maps or extreme wafer edge performance is of the interest.

There are several known ways of providing full wafer images/maps, e.g. by "one-shot" imaging entire wafer (e.g. Spark Nanda technology, Lars Markwort et al. "Full wafer macro-CD imaging for excursion control of fast patterning processes", Proc. of SPIE Vol. 7638, 2010 or using scanning (US patent application US2019/0244374 A1). These tools are using spectral filters or RGB camera and analysis of the wafer images based on the DOE wafers, specially prepared in advance to define correlation between image and parameters of interest. Scanning tools were proposed to use as a part of the polishing equipment—to allow wafer images close to the processing.

The Integrate Metrology (IM) concept is described in detail in Nova patents U.S. Pat. Nos. 6,752,689, 9,184,102, etc. Measurement unit (MU) of the IM usually is attached to the Equipment Front End Modules (EFEM) of the process tool and wafer is transferred by the robot of EFEM to the IM system for the measurements. Standard measurement sequence might include global and fine alignment of the wafer done with the imaging system as described in Nova patents U.S. Pat. Nos. 5,682,242, 6,752,689, etc.

It is highly desirable for optical metrology system to provide a solution for full wafer metrology without harmful throughput implication

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
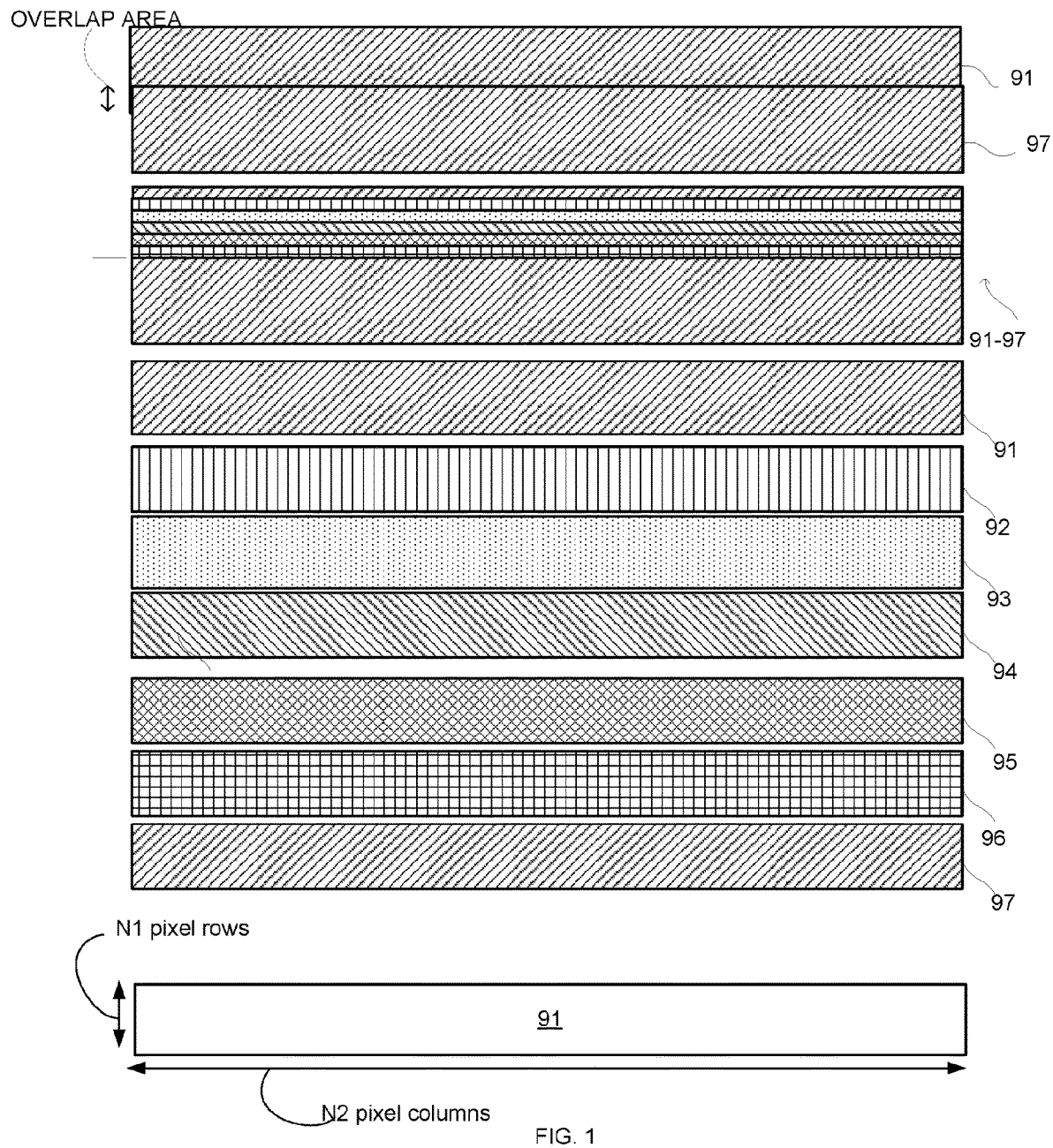
FIG. 1 illustrates an example of frames.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The following text may refer to a wafer. A wafer—especially a semiconductor wafer—is merely an example of a sample.

The following text refers to a full wafer scan. It should be noted that any reference to a full scan may be applied mutatis mutandis to a scan of only one or more parts of the wafer.

The following text may refer to a light emitting diode (LED). This is merely an example of an illumination source.

The following text refers to a wavelength. Any reference to a wavelength should be applied mutatis mutandis to a range of wavelengths. Additionally or alternatively—any reference to a wavelength may be applied mutatis mutandis to any other property of the illumination and/or collection—such as, polarization, angular content of illumination or/and collection beams, and the like.

The following text may refer to an effective field of view (FOV). An effective FOV is a FOV that is taken into account during the metrology. The effective FOV may be the entire FOV of the area scan camera of a part of the FOV. For example—if only a fraction of the camera pixels form a region of interest that is processed for the metrology—then the effective FOV is limited to these fraction of pixels.

There is provided a very fast (for example—within 0.5, 1 or 2 seconds) full wafer scan metrology system that may include:

a. An illumination module that may illuminate areas—referred to as regions of interest (ROIs) of the wafer using pulses of illumination elements such as LEDs. The pulses are of different wavelengths (one after the other), wherein each wavelength illuminates the corresponding ROI during a set and during a metrology session.

b. One or more area scan cameras having narrow and elongated effective fields of views (FOVs). The one or more cameras provide low resolution spectral information about the sample—as the spectral information is limited to the illumination wavelengths.

c. One or more additional optical elements. For example—lenses, objectives, light guides, beam splitters, and the like.

The frames obtained from the relevant wafer areas, when the last are illuminated (at different points of time) by the different wavelengths.

The illumination may be performed out of chamber (MU) and/or when the wafer is moved from one chamber and/or tool to another chamber and/or tool. An example of such a movement may include a movement of the wafer from a processing tool such as CMP polisher to metrology tool or from a metrology tool to the polisher, a movement of the wafer from a cassette or to the cassette, and the like.

The wafer can be moved by a robot of an EFEM or by any other means.

The movement of the robot may exhibit speed variations—in contrary to movement of the stage with a constant speed. The movement of the robot may not be controlled by the optical metrology system. The maximal speed of movement of the wafer should be known or estimated.

The effective FOV is narrow and elongated. The number of pixel rows (width, narrow dimension of the effective FOV) is a tradeoff between the number of possible wavelengths that may be used in a metrology session (for example at least 5, 8, 10, 15, 20, 25, 30, 35) and the intensity of reflected light—as larger effective FOV will require to illuminate larger areas of the wafer- and may reduce the illumination energy density.

Consecutive frames of the different wavelengths are overlapped and this may provide a full wafer image coverage at any of the different scan wavelengths. The overlapping allows the method to obtain visual information of any point of interest of the wafer.

Any optical parameter—for example the wavelength, polarization, and the like may be selected.

The optical parameter may be selected based on a metrology parameter (of the wafer or any part thereof) to be evaluated. The metrology parameter may refer to one or more structural elements (for example—one or more sub-micron structural elements, one or more nanometric range structural elements, one or more sub-micron areas of a bare wafer), and may refer to one or more properties of the one or more structural elements (for example critical dimension (s), film's thickness, composition(s), and the like).

One or more optical parameter be selected based on a model-based simulation of the optical process of illuminating a sample, collecting radiation from the sample and generating detection signals when applied on the to one or more structural elements. The model-based simulation reveals the one or more optical parameters that once applied provide results (for example—detection signals) that are sensitive (for example be the most sensitive) to the one or more tested metrology parameters.

Optical parameters (such as wavelengths) may be selected out of a larger set of parameters that can be provided by the system.

It should be noted that the optical metrology method has a coarser spectral resolution than spectral reflectometry—as it measures signals resulting from an illumination by a limited number of wavelengths and each wavelength represents narrow spectral range in case of an illumination by LED.

Assuming that the optical parameters include six different wavelengths that may be emitted from one or more sets of six LEDs.

Referring to FIG. 1—that illustrates seven frames 91-97. The first six frames 91-96 form a set of frames that includes six frames 91-96 that were are obtained as a result of illuminating the wafer with six different illumination wavelengths. The seventh frame 97 represents start of a next set of six frames—and is obtained as a result of illuminating the wafer with the first wavelength of the set of six different illumination wavelengths.

The LED pulses are sequentially timed to provide the overlapping frames. It should be noted that FIG. 1 illustrates the overlaps obtained at a constant and maximal speed (scan velocity) of the robot—whereas in reality the speed may change over time and during a metrology session. Lower speeds will result in greater overlaps between frames.

In FIG. 1—the distance between the pulses could be predetermined and equaled to e.g. ⅛ of FOV (field of view in scan direction) divided by maximal scan velocity.

Figure 2:
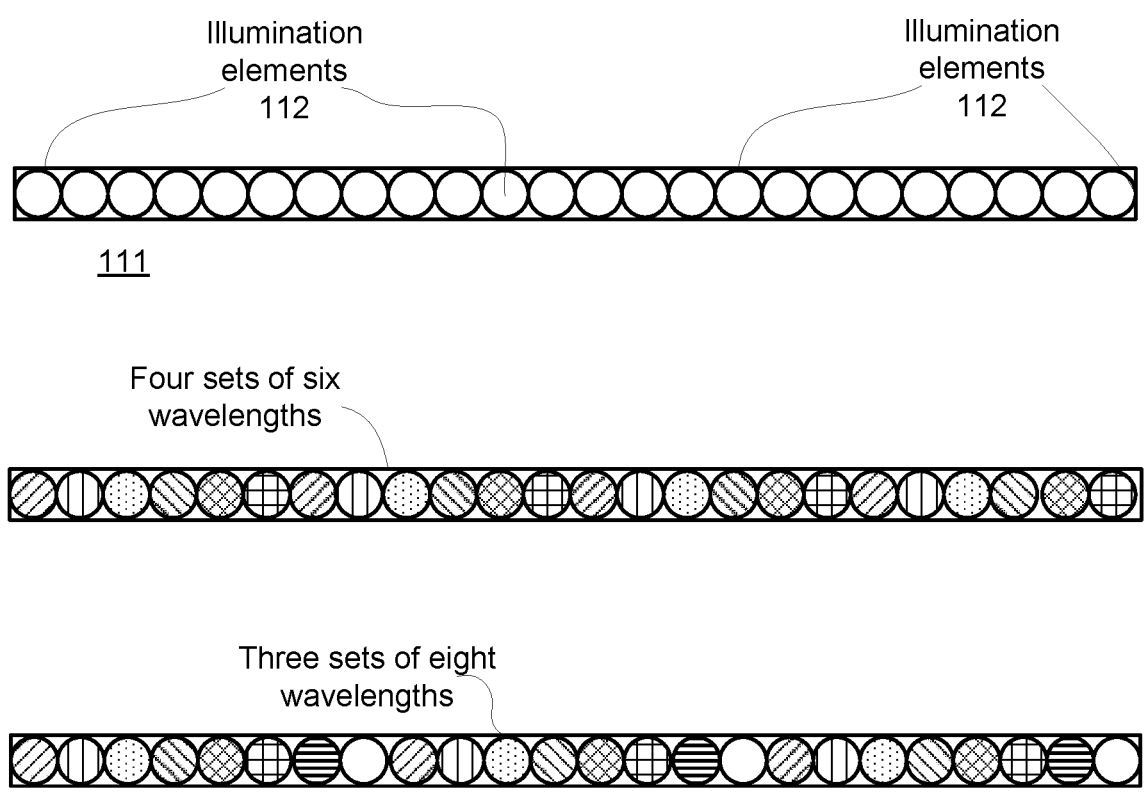
FIG. 2 illustrates an example of illumination elements.

FIG. 2 illustrates linear array of illumination elements 112 that may be LEDs. It also illustrates a four sets of six LEDs each (for emitting six different wavelengths). FIG. 2 also illustrates three sets of eight LEDs each (form emitting eight different wavelengths). It should be noted that any arrangement of LEDs may be provided.

In such case after six strobes when the first wavelength illuminates the wafer LED will be turn on again the overlapping between frames 91 and 97 will be ⅔ FOV (if the scan velocity will be the constant and equals to the maximal scan velocity).

Due to the variations in the speed of the robot—the overlap between related frames varies and there is a need to compensate for the varying overlaps between such related frames. Frames are related when they are obtained using the same wavelength of illumination.

There is a need to generate a map of the entire wafer (per group of related frames)—and this requires combining (stitching) related frames to provide a map per wavelength of illumination.

The combining requires to determine the location of the area of the wafer that was imaged by each frame.

Stitching of frame of a bare wafer is more difficult than stitching frames of a patterned wafer. The wafer patterns may include anchors that may be used for determining the location of each frame. In the case of bare wafer—there may be no anchors—and the edge of the wafer may be used to detect the location of the area of each frame. The location of the edge may be sensed by one or more cameras of the optical metrology system. Additionally or alternatively—other sensors may be used for edge detection and/or for following the movement of the wafer—for example by tracking the robot position using visual or non-visual sensors.

An example of an effective FOV that is smaller than the entire FOV of a camera is provided and may include using a CMOS area sensor with ROI selection. Such an area sensor allows choosing a limited number of rows for the image grabbing while frame rate will be much higher than one with the full frame. E.g. Basler a2A1920-160 umBAS camera: 1920×1200 pixels, 160 framed per second (fps), when used in ROI mode of 1920×40 pixels (20 uSec exposure) it runs at 2717 fps.

Assuming that the wafer moves with constant velocity of 0.5 m/s. The pixel size on the wafer is 50 micrometers. An illumination system with multiple LEDs may provide a uniform illumination over an area 300 mm long and 2 mm wide.

To overlap all 300 mm length there are provided four cameras, where each images 96 mm long area (for 1920 pixels of Basler a2A1920-160 umBAS camera) with some overlapping where 75 mm per camera without overlapping. 40 pixels give 2 mm for the width. 300 mm scanning with velocity of 0.5 m/s takes 0.6 sec.

The maximal amount of frames for Basler a2A1920-160 umBAS camera during 0.6 sec is 1630 frames.

From another point of view, there are needed about 200 frames for each color of LEDs to get an overlapping of 0.5 mm (300 mm/1.5 mm=200 frames, 2 mm-1.5 mm=0.5 mm).

It means eight different wavelengths (1600 frames/200 frames per color=8) can be used without decreasing of scan velocity for full wafer mapping with multi area multi-strobe LEDs imaging system.

Figure 3:
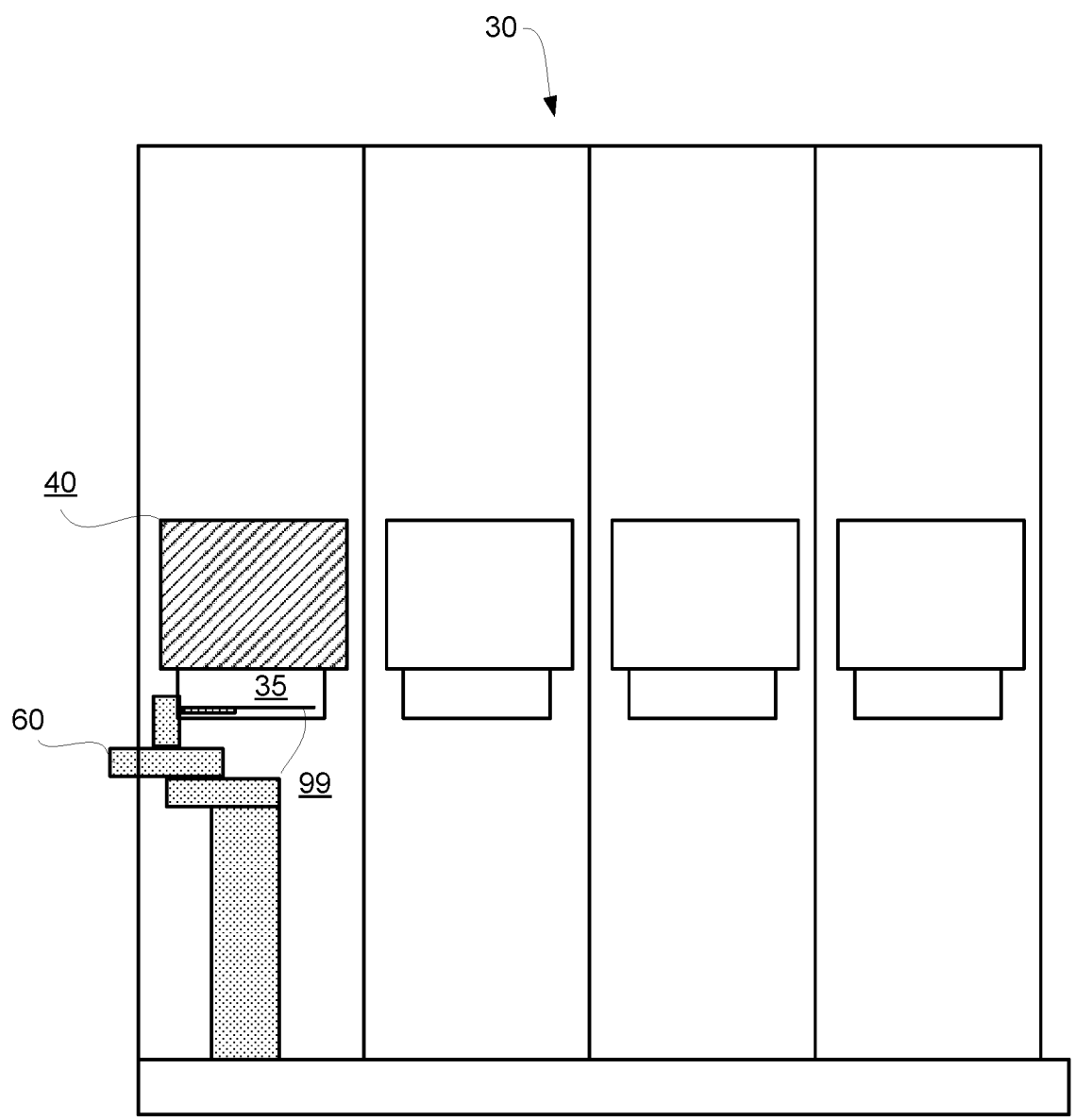
FIG. 3 illustrates an example of an optical metrology system and its environment.
Figure 4:
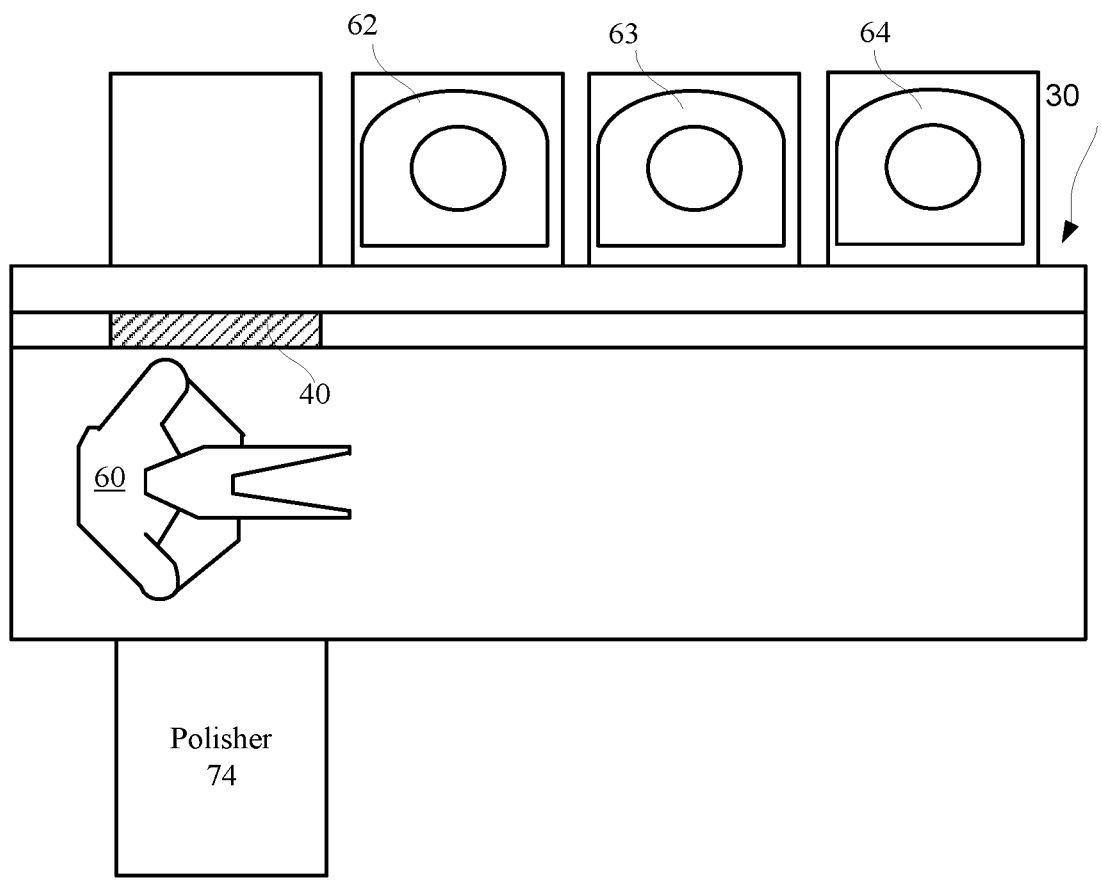
FIG. 4 illustrates an example of an optical metrology system and its environment.

FIGS. 3 and 4 illustrate an example of the metrology system 40 and its environment—for example IM tool 31 that is integrated with a EFEM 30 of a processing equipment (CMP polisher)—denoted 70 in FIG. 4. Other environments may be provided—for example—another environment may not include an IM tool 31.

The environment also includes robot 60 (illustrates a holding wafer 99) and a IM tool 31, (or any other high resolution optical metrology process—whereas high means higher than the process executed by optical metrology system 40) having a chamber 35 that is configured to receive wafer 99 from the robot, perform a high resolution spectral reflectometry process and then return the wafer to the robot.

The robot may place the wafer into one or more cassettes (FOUP's) 62, 63 and 64 of EFEM 30 and/or provide the wafer to another tool—such as polisher 74.

Robot 60 may be a part of EFEM and may travel inside it. The cassettes and the IM tool may be connected to EFEM via ports/openings. The IM tool is usually connected via six bolts attachment and cassettes put on so called load-ports supporting them. Metrology system 40 is assembled between the IM tool 31 and the EFEM. The metrology system 40 may be aligned by Z-axis according the Z-position of robot's arm (it could be configured to be adjustable partially of in whole during installation—e.g. according to the Z-position of the wafer on the robot's arm).

The optical metrology system 40 is positioned to perform the metrology when the wafer is loaded by robot 60 to the IM tool 31 and/or when the wafer is unloaded from IM tool 31.

The optical metrology system 40 may be an add-on system—and should be shaped and sized based on size constraints of other structural elements of its environment (e.g. configured to be installable between EFEM and IM tool 31).

Metrology system 40 could be configured a "frame-like" around opening/port with optics/illumination at its top portion—connecting of IM tool to the EFEM is at least partially sealed. The metrology system 40 could be connectable to the IM tool 31 control unit/computer(s) or additional Separate Control unit/computing of the metrology system 40 may be accommodated within or outside IM tool.

Figure 5:
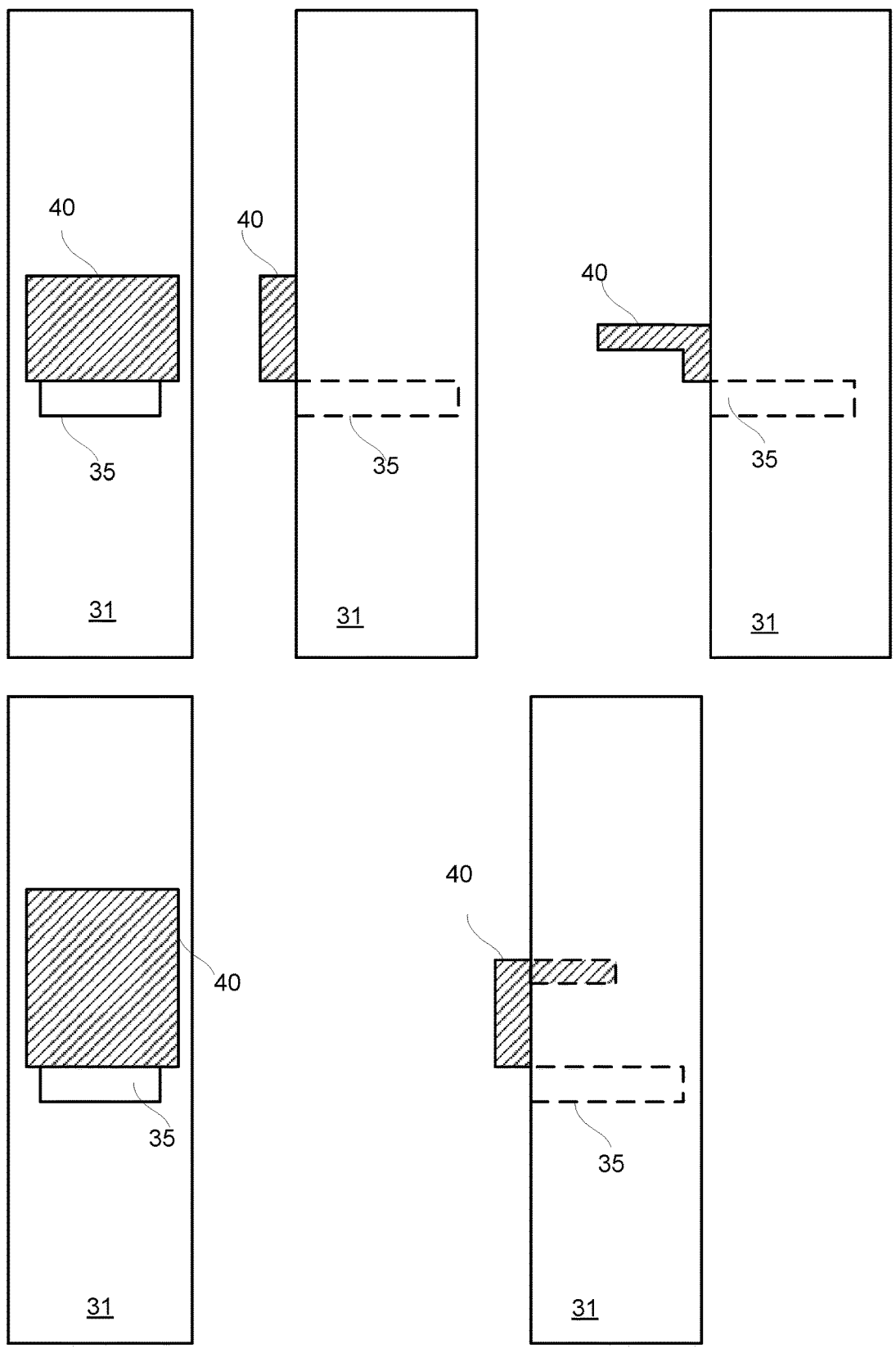
FIG. 5 illustrates examples optical metrology systems and its environments.

FIG. 5 illustrates examples of front views and side views of metrology system 40, the spectral reflectometry tool 31 and its chamber 35. The metrology system 40 is compact—may have dimensions (width and/or height and/or depth and/or extend outside the spectral reflectometry tool) by much less than one meter. For example—the metrology system 40 may extend outside the spectral reflectometry tool by 5-15 centimeters (or more), have a width and height of about 25-45 centimeter, and the like. In some of the examples of FIG. 4—at least a part of the metrology system 40 is located within the spectral reflectometry tool 31.

The spectral reflectometry tool 31 may further process the outcome of the metrology system 40 for various purposes—for example calibration, verification, selection of sites to be evaluated (where outcome of the metrology system 40 may indicate a presence of problem, a deviation from spec, and the like).

Figure 6:
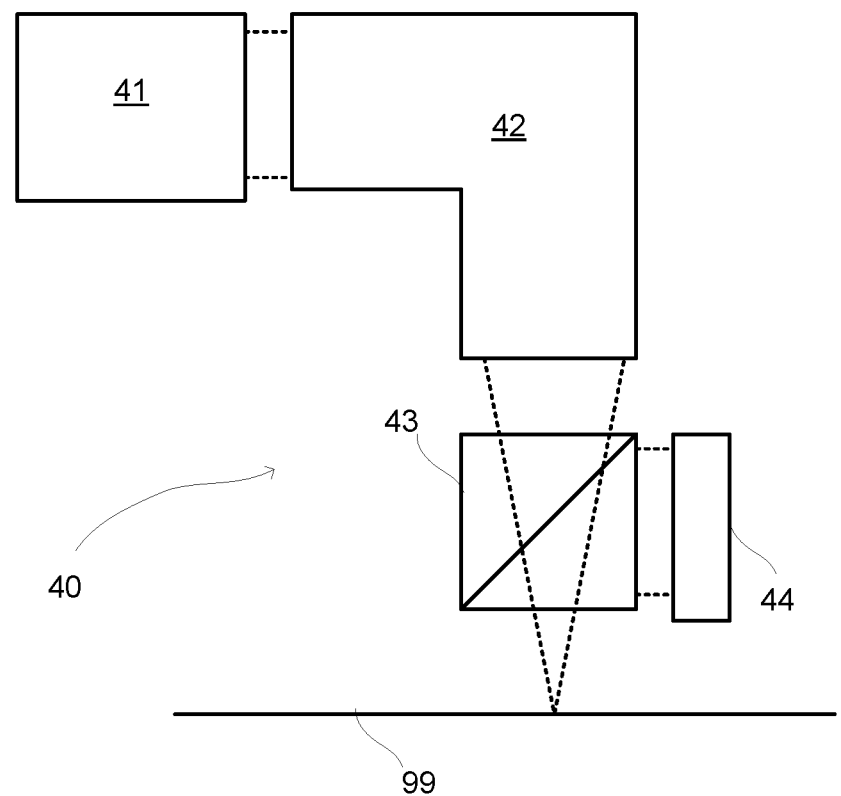
FIG. 6 illustrates an example of components of an optical metrology system.

FIG. 6 illustrates an example of some of the components of the optical metrology system 40.

The components includes LED based illumination system 44, beam splitter 43, telecentric objective 42 and one or more cameras 41 such as a line or area scan camera.

The telecentric objective has a vertical portion and a horizontal portion.

The LEDs 41 and the beam splitter form a coaxial illumination system. The beam splitter may have a width and length of about 4 centimeters.

Light from the LEDs 41 are directed by the beam splitter 42 towards the wafer 99 (for example at a normal incidence angle), the light is reflected from wafer 99 towards the vertical portion of the telecentric objective 43 and then is outputted from the horizontal portion of the telecentric objective 43 towards camera 44.

It should be noted that while the example of FIG. 6 referred to a telecentric objective—that a non-telecentric objective (for example non-telecentric macro lenses) can be used. This may require compensating for the unevenness of illumination angle resulting from using a non-telecentric objective.

Figure 7:
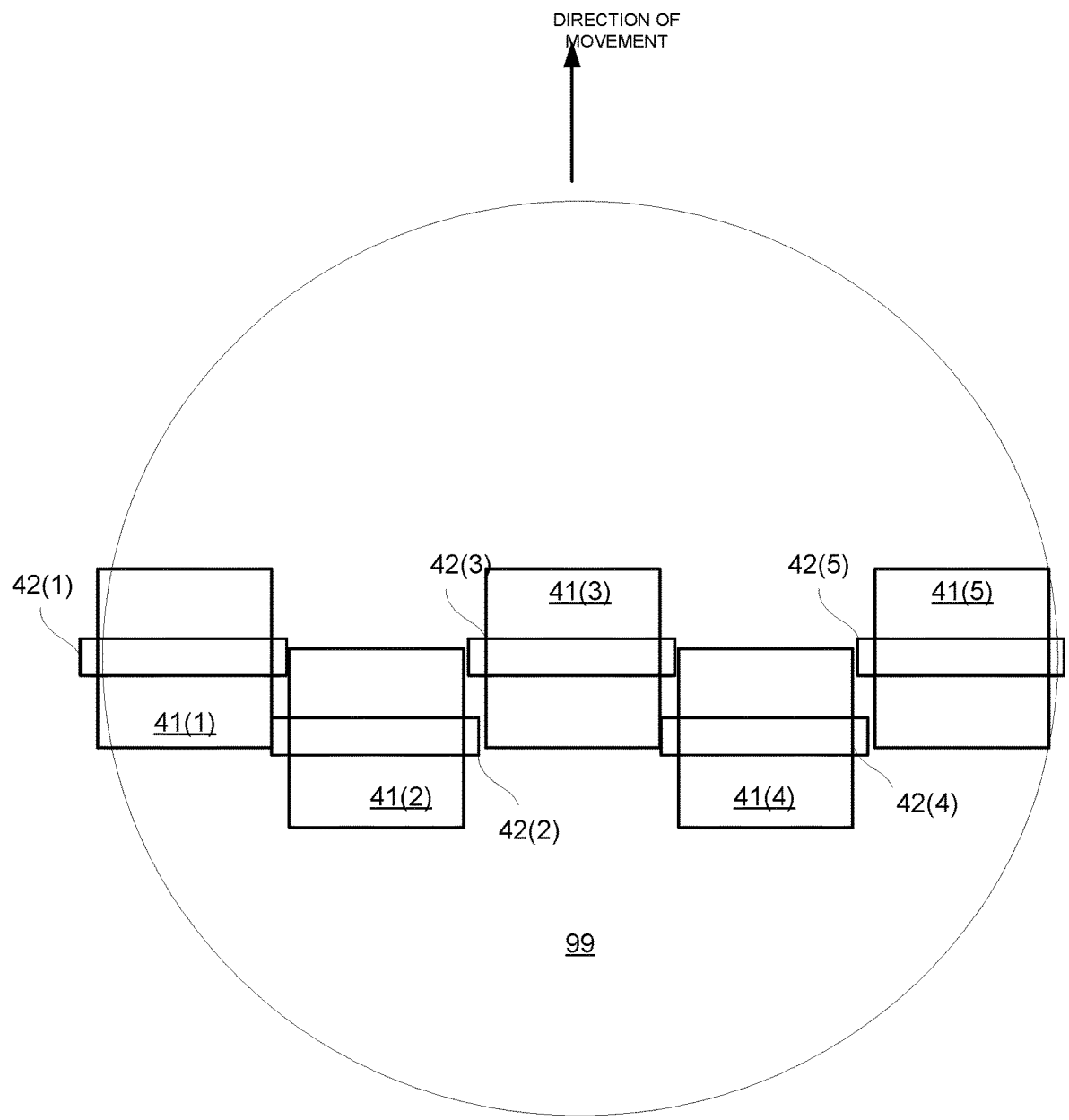
FIG. 7 illustrates an example of a wafer, cameras and effective fields of view of the cameras.
Figure 8:
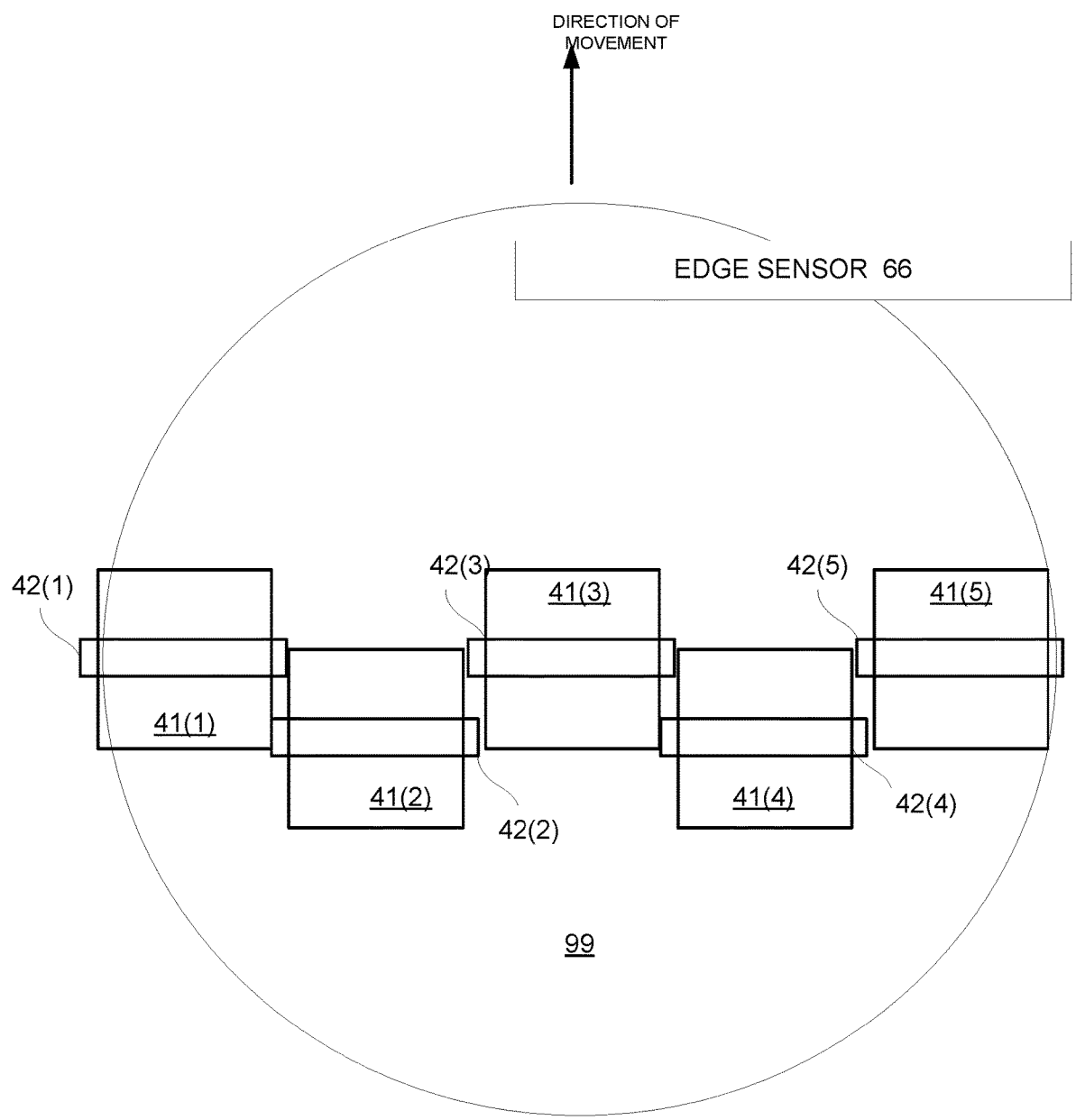
FIG. 8 illustrates an example of a wafer, cameras and effective fields of view of the cameras.

FIGS. 7 and 8 illustrates a sequence of five cameras 41(1)-41(5) that have narrow and elongated effective FOVs 42(1)-42(5) respectively that "cover" the entire length of wafer 99. FIG. 8 also illustrates a dedicated edge sensor 68 for detecting the edge of the wafer. The edge sensor 68 may be linear and has a field of view that may have a length that may exceeds a radius of the wafer—and may be oriented (for example normal) to an axis of movement of the wafer by the robot. The edge sensor may be positioned below the wafer—and may use the illumination of the main system.

Figure 9:
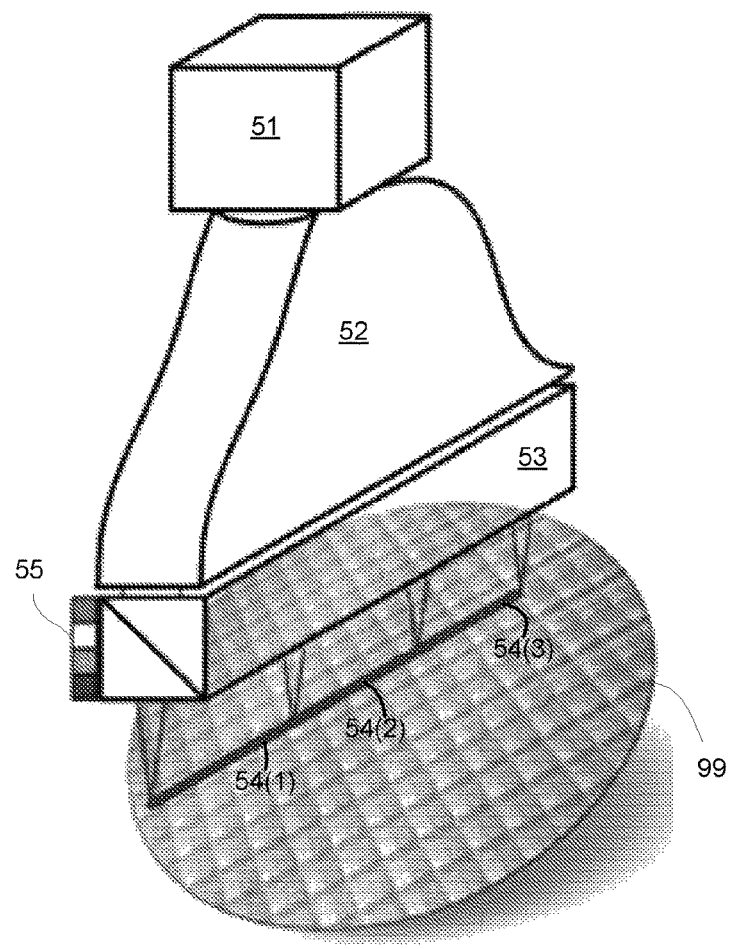
FIG. 9 illustrates an example of components of an optical metrology system and frames.
Figure 9:
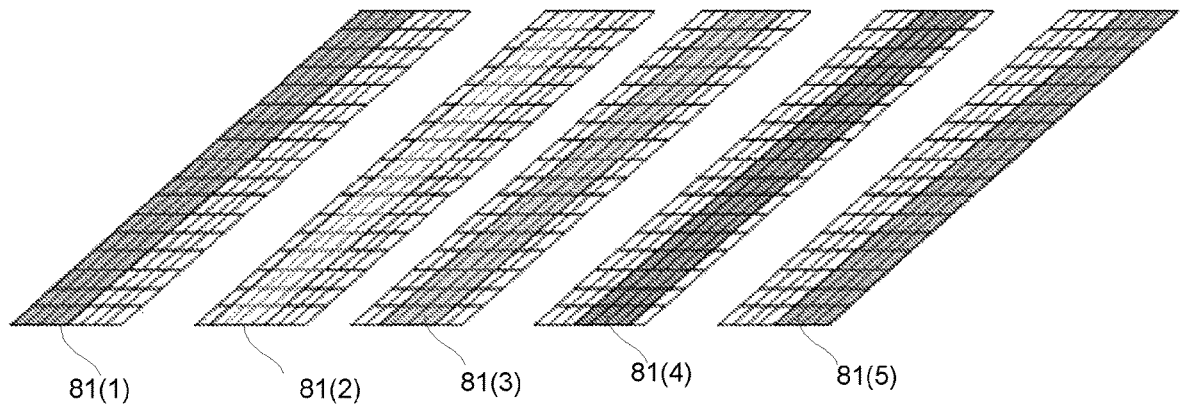

FIG. 9 illustrates an example of some of the components of the optical metrology system 40. The components include LEDs 55, beam splitter 53 and an objective lens 52 that has an input FOV that is wider than ins output FOV. The objective lens 52 collects light from multiple illuminated segments 54(1), 54(2) and 54(3) that stretch along the entire width of the wafer 99 and directs the collected light to a camera 51 that is much narrower than the width of the wafer.

FIG. 9 also illustrates a set of four frames 81(1)-81(4) and a first frame 81(5) of the next set of frames.

It should be noted that the metrology system 40 may use contact image sensors (CIS) that are positioned very proximate to the wafer—almost in direct contact with the wafer. Examples of CIS sensors that can be used may include, for example, VTCIS or VDCIS sensors of Tichawa Vision GmbH.

The wafer itself may not be entirely flat, and the wafer may be moved by the robot in a path that may deviate from a pure horizontal path. In order to prevent physical contact between the wafer and the CIS (or any other optics of the metrology system 40)—the metrology system 40 may be located at a safety distance from the wafer and/or the system may move according to measured movement of the wafer and wafer flatness.

Figure 10:
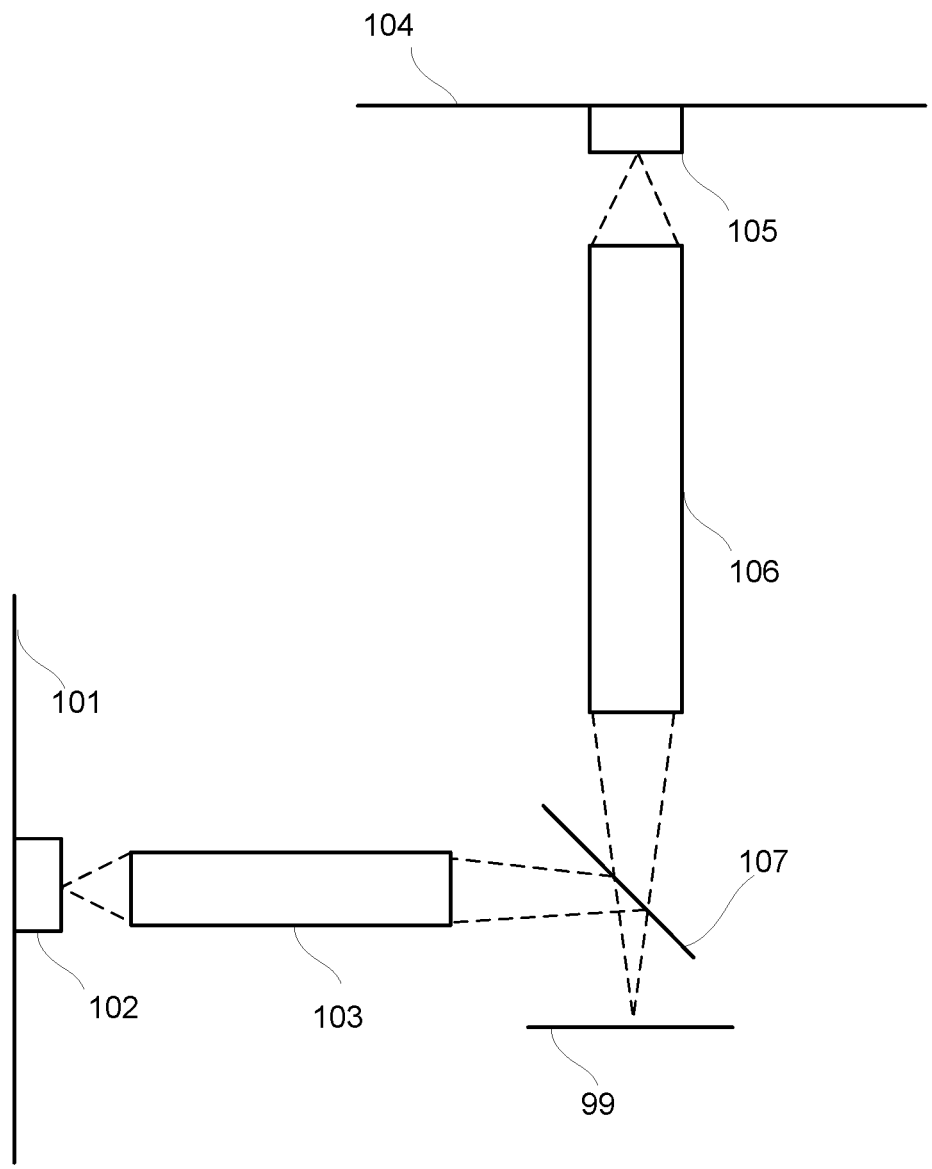
FIG. 10 illustrates an example of components of an optical metrology system.

FIG. 10 illustrates an example of some of the components of the optical metrology system 40. The components may include illumination elements 105 (may be located on a first board 104), lens 106, beam splitter 107, light guide 103, camera 102 that may be located on a second board 101.

The metrology system 40 may have cameras with pixels. A camera pixel may "cover" an area of the wafer having a width/length in the range of microns (for example 20, 40 60 micron), may include many pixels per row (for example for full scan of 300 mm wafer and pixel of width of 20 micron—there are 15000 pixels per row).

It should be noted that the metrology parameter may change during a single scan of a wafer—for example different metrology parameters may be applied on different parts of the wafer—for example a memory area may be scanned differently than a logic area.

Furthermore—the metrology parameters may be evaluated multiple times—and may be changed—for example in order to increase the sensitivity of the metrology process in changes in values of the evaluated parameter.

Figure 11:
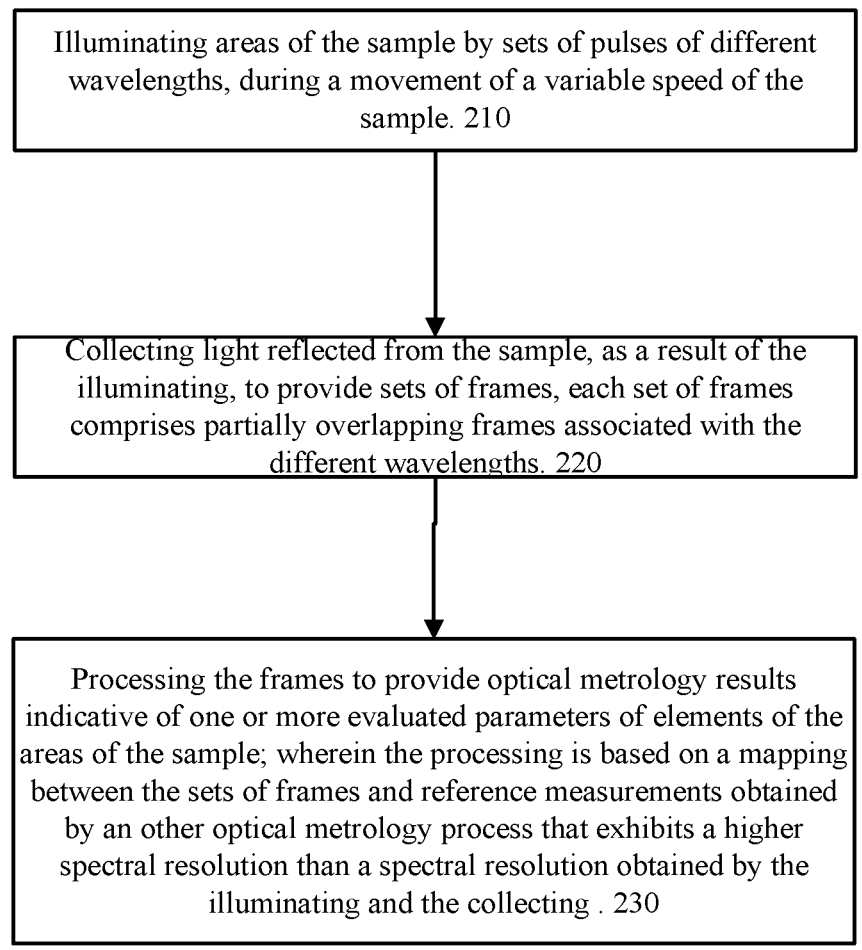
FIG. 11 illustrates an example of a method.

FIG. 11 illustrates an example of method 200 for optical metrology of a sample.

Method 200 may include steps 210, 220 and 230.

Step 210 may include illuminating areas of the sample by sets of pulses of different wavelengths, during a movement of a variable speed of the sample.

Step 220 may include collecting light reflected from the sample, as a result of the illuminating, to provide sets of frames, each set of frames comprises partially overlapping frames associated with the different wavelengths.

Step 230 may include processing the frames to provide optical metrology results indicative of one or more evaluated parameters of elements of the areas of the sample; wherein the processing is based on a mapping between the sets of frames and reference measurements obtained by an other optical (or other reference) metrology process that exhibits a higher spectral resolution than a spectral resolution obtained by the illuminating and the collecting.

The processing may be executed by a computerized system located in the metrology system 40, in the IM tool 31, being in communication with the metrology system 40, being in communication with the IM tool, and the like.

There are provided a two systems (also referred to as units, modules, devices or tools:
  a. A first system has a first spectral resolution (for example—processes or detects radiation of a first number of wavelengths) and a first throughput. It may provide macros scale information.
  b. A second system has a second spectral resolution (for example—processes or detected radiation of a second number of wavelengths) and a second throughput. It may provide micro scale information.

The first spectral resolution is lower than the second spectral resolution.

For example—while the first system may obtain and process optical information related to 8, 10, 15, 20 and up to a few tens (for example up to 30 or 40) wavelengths—the second system may obtain and process optical information related to 100 and even few hundreds of wavelengths.

The first throughput exceeds the second throughput. For example by at least 10, 20, 30, 40, 50, 60, 70, 80, 90, or 100 (and even more).

The IM tool mentioned above is an example of the second system. The metrology system 40 is an example of the first system.

Figure 12:
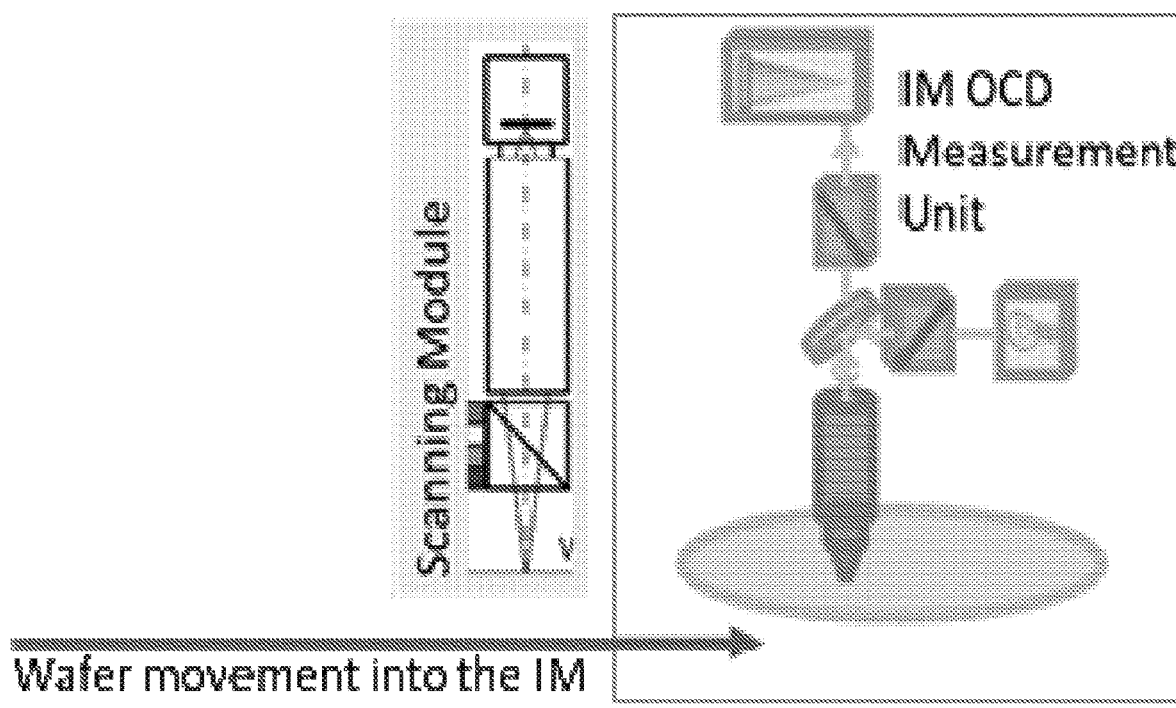
FIG. 12 illustrates at least a part of a system.
Figure 13:
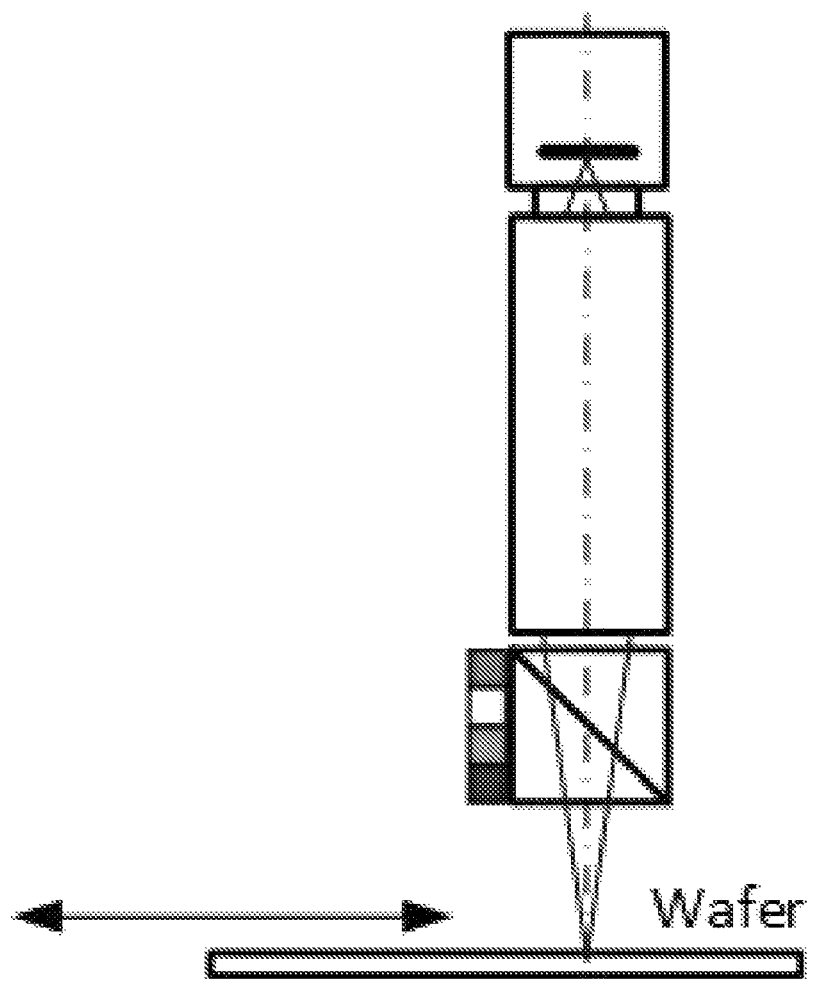
FIG. 13 illustrates at least a part of a system.

The first system may be used to provide a map of the entire wafer. The second system may be used to provide a measurements of selected sites of the wafer. FIG. 12 illustrate a first system (left side of the figure—"scanning module") and a second system (right side of the figure—"IM OCD measurement unit").

The first system may be a scanning module and the second system may be a single shot optical module.

The first and second systems may complement each other—and information from the first system and the second system may be processed together. Information from the first system may assist in selecting sites. Information from one system may affect the manner the second system is operated. Information from one system may be used to verify information of the other system.

The first system allow fast scanning of large portions of the wafer, including entire wafer, during wafer transfer from/to EFEM to/from the IM tool, wherein the first spectral resolution may be enough to find one or more metrology parameters of interest—for example allow to capture WIW variations.

The second system may capture normal incidence reflected light and/or diffracted light, to allow flexibility and coverage of multiple metrology and inspection applications for different areas of the semiconductor manufacturing, including CMP, Deposition and Patterning.

Both systems may be based on illumination by the combination of LEDs that allow usage of any combination of LEDs on the one or more wavelength—while the second system may provide coverage over a wide spectral range—for example using LEDs that provided an aggregated coverage—for example between UV to IR: 265 to 960 nm, between 190-1000 nm and the like. The first system uses a limited number of wavelengths or narrow wavelength ranges (a narrow wavelength range may be the range emitted by a LED—such as a single color LED—where the single color LED is not perfectly monochromatic).

Both first and second systems may allow polarization control (full or partial) of both incident and collected light for operation in different regimes, including bright field BF and dark field DF.

Figure 15:
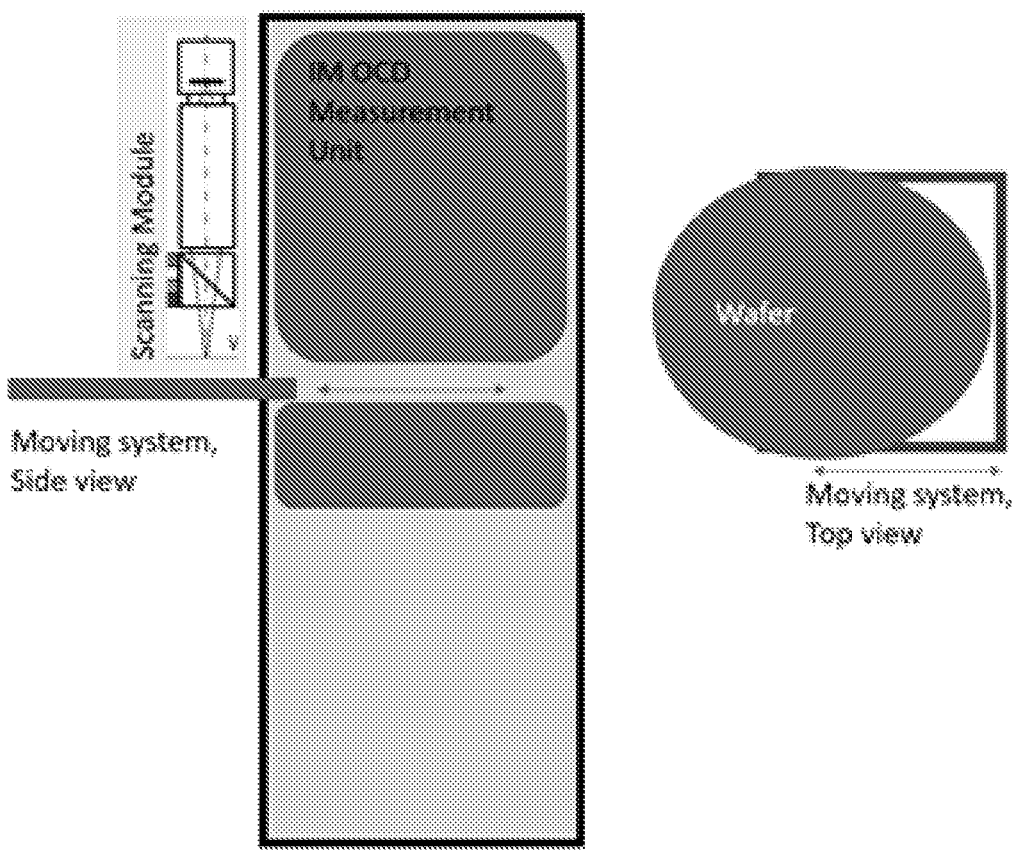
FIG. 15 illustrates at least a part of a system.

The first system may be located above the wafer pass from the EFEM of processing equipment to the IM tool and is capturing the "image" of the wafer when it is moving in the direction of the IM tool or being dispatched back to the processing equipment. In one of the possible implementations, a scanning module is applied in normal incidence configuration, when both illumination (light directed to the sample from the source) and collection (reflected light) are at normal incidence (NI). Reflected light is being collected by a lens and measured by a fast line camera (with sampling rate is around from 50 to 150 kHz to require fast measurements). Line camera may have 10-20K pixels with pixel size of 5-10 μm to allow full wafer measurement during load or upload. Optical scheme of the NI macro optic module is presented in FIG. 15.

Figure 16:
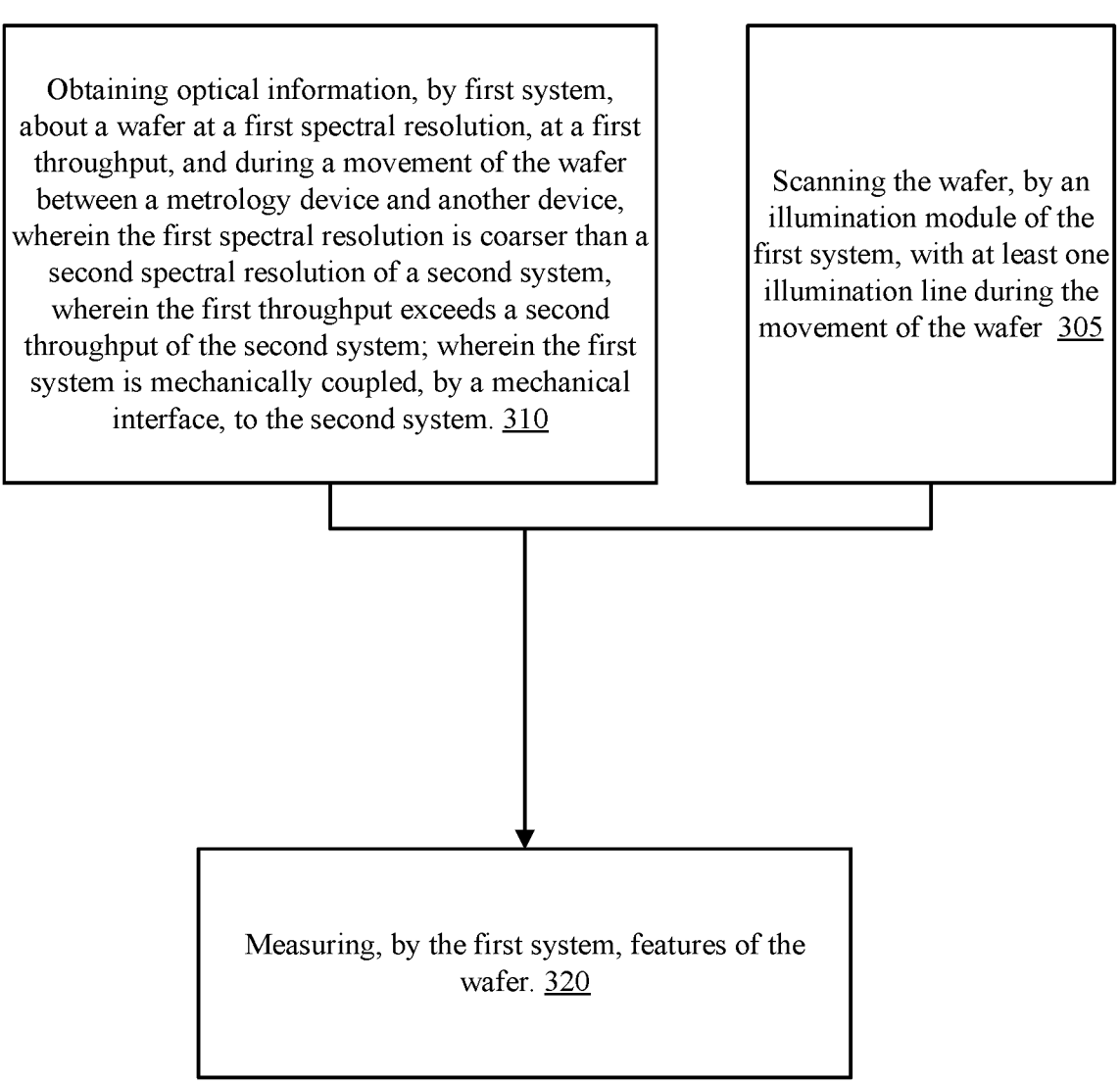
FIG. 16 illustrates a moving system.

Volume available for the first system is limited (due to IM footprint), so the best system for the full image of the wafer is normal incidence line scan concept, based on the pulsed LED illumination, line or area detector (scan camera) and optical imaging system optimized for line FOV. Obtaining of optical information can be done for the entire 300 mm wafer during a single scan as in FIG. 16, or for ½ of the wafer—150 mm for a double scan (on the way in and out). In this case, multi-wavelength sensing may be implemented using illumination system with multiple LEDs and camera having N lines. The time diagram of such sensing can be based on exposure time for single LED type equal to that equivalent to the wafer motion over the length equivalent to the pixel size at the wafer plane. Synchronization of the wafer speed, LED switch and capture rate of the multi-lined liner detector allow to get multiple frames of the entire wafer with multiple colors with minimal resolution loss (FIG. 5).

In another implementation, the first system is designed to measure diffracted or scattered light. In this implementation sample illumination and collection angles are different: Collection angle is at normal incidence, while illumination is at oblique angles.

The first system optical module size may be fitted to the load-port installation so that both foot-print and integration (e.g. 6 Bolt) of IM tool are not affected: with minimal thickness (in the direction of the wafer movement) and with the height and width defined by the existing dimensions.

IM Tool

Figure 14:
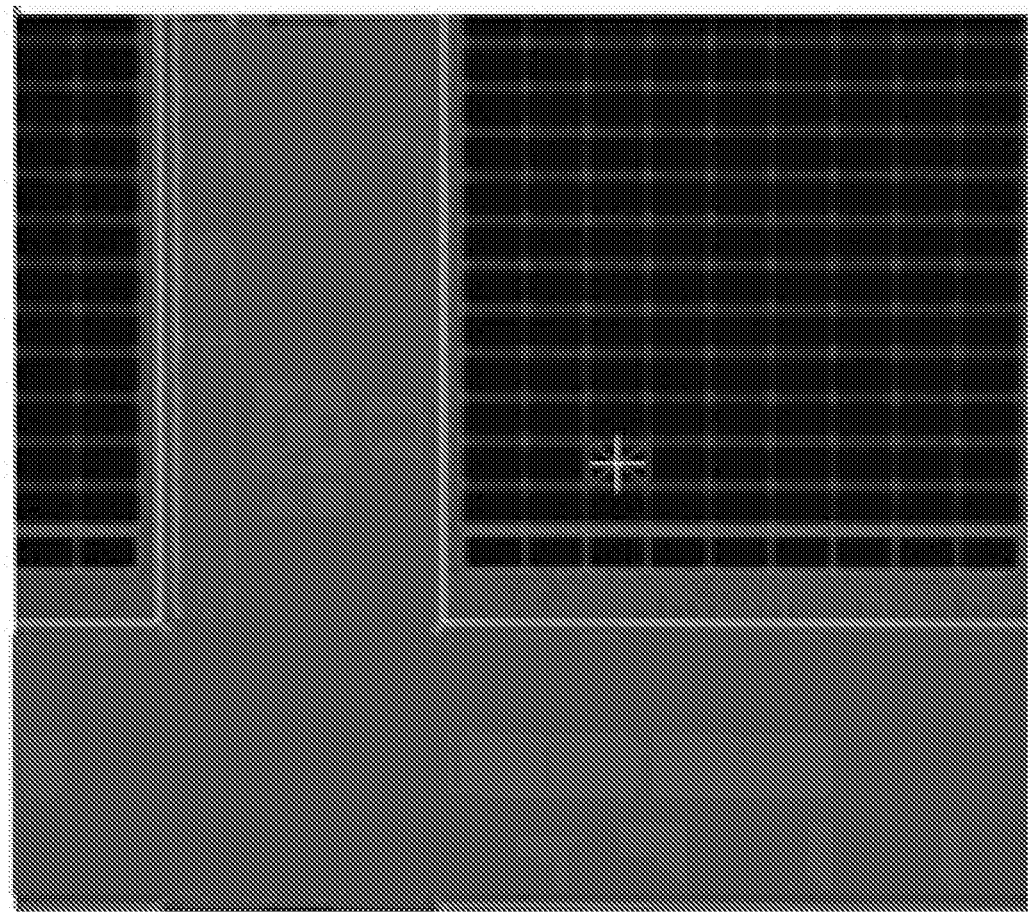
FIG. 14 illustrates an image.

The optical part of the IM tool might include movable optics, (navigating over the wafer could be also implemented by movable wafer stage (X-Y-, R-Theta or combination thereof)—to allow small footprint and confinement to the size of the FOUPs (standard integration to the polishers is FE Bolts integration, where the IM tool is located at one of the standard ports. This moving optics may allow at least one of two functions—spectral: allow spectral measurements of the target of interest and vision: allows to capture images that are used for multiple purposes, including pattern recognition, best focus, local and global alignments, etc. Vision system equipped with the camera (that can be monochrome or RGB or hyperspectral) and dedicated light source (that can be wide wavelength range with filters, set of LEDs, etc), can be used as a micro optic module to capture high resolution images at predefined locations on the wafer (see FIG. 14).

The second system may include:
a. Using a Vision Channel "micro" images collected in standard measurement sequence spectra to predict variations of the profile geometrical parameters at the area around the spectral measurement spot (scatterometry spot size is below 40 microns) (see FIG. 14).
b. Modify and optimize image grabbing conditions and sequences to allow collecting images for prediction of the die maps and examination of the problematic areas on the wafer defined by full wafer map images of the scanning module and/or by scatterometry data.

All proposed imaging solutions can be also applied to SA scatterometry tools.

Wafer Transfer

In order to get good quality image with minimal possible pixel size wafer movement under the scanning system need to be controlled.

The possible uncertainties of the wafer movement can be split into three categories: uncertainties that that optical system is capable to account for without any HW additions (1) and uncertainties that optical system has to be flexible enough to accommodate for (2), and uncertainties that are easier to account on the wafer movement itself (3).

There are few uncertainties of the wafer movement that optical system should be capable to account for without any modifications are uncertainty in the in the X,Y position. In addition, focus can be either accounted for by a simple autofocus system, or can be kept fixed by setting the specifications of the Z location of the wafer.

Even if the average Z wafer position can be fixed at a desired level, wafer Bow can affect the imaging and thus need to be accounted for. (For majority of the current wafers bow is usually below +/−250 microns, but it can be up to 500-800 microns, and for the extreme 3D NAND cases it can become even +/−1 mm. In order to accommodate for the Bow that can be different for different wafer optical system has variable NA, from the large NA values (of above 0.1-0.2 for flat wafers) to the extremely small NA values (of 0.02 and below for measuring extreme bow of +/−1 mm), the compromise in this case will be small resolution drop and increase in the measurement time. In any case, recipe for imaging will be optimized for Bow wafer and will include NA and optimized wafer speed.

Moving system (scheme presented in FIG. 16) should allow controllable and constant wafer speed, defined by recipe for the optimal wafer imaging, without dynamic tilts and dynamic focus changes (both below <50-100 microns). All these requirements may be met by robots, or, if specs of existing atmospheric point to point robots cannot match requirements, may be solved by design special retractable rail drawer, that will get the wafer from the robot in front of the imaging system, and will scan the wafer below the imaging system at the desired speed and in the controllable, finally delivering wafer to the IM module for OCD measurements. Actually, this rail drawer or retractable semi buffer, should allow wafer exchange outside of the MU. At all times drawer is inside IM, it comes outside only to pick/return the wafer, not interfering with a robot movement inside the EFEM.

Imaging Metrology

The target of imaging metrology is to convert the image into the map of parameter of interest on the entire image, preferably multi-spectral image. The sequence of operations that may be used to demonstrate the proposed approach is presented on the example of the measurement of thickness of the residues in memory arrays. This approach can be used both with static and moving optics modules.

Imaging Metrology Recipe Setup

Step 1. Imaging Conditions

Standard OCD recipe is created based on the spectral information collected on the feature of interest (memory array). Interpretation results include profile information, including all parameters of interest, that can be used for image collection setup. Spectral information together with parameters of interest, measured by OCD, is used to define best configuration for the image collection (# of wavelength combinations for image collection) for the best performance of the target parameters of interest. This image collection configuration together with the OCD recipe will be used in all future measurements.

Step 2. Image Processing Recipe

After pretreatments done for image quality improvement, image processing recipe (can be also defined as pattern recognition) is created that allow to automatically identify the area of interest where we would like to measure parameters of interest and select the required pixels (for all images captured with all wavelength combinations). As a results image of the areas of interest is created: in our example we get the image of memory arrays. Additional treatment of the pixels in the areas of interest can be done, that include averaging and/or noise reductions and/or other calculations that allows more stable metrology performance. Averaging can be done on the single arrays, parts of the die, and for the entire die, and all different averaging schemes can be used to focus on different variability scales, based on the requirements.

Step 3. Machine Learning (ML) Recipe for Image Parameters

X,Y coordinates of these arrays are then matched to the coordinates of the OCD measurements—to allow direct correlation of the image parameters and OCD reference measurements and creation of ML recipe that allow to translate image parameters into the metrology parameters of interest. Standard train, test and validation is done for ML recipe.

Step 4. Optional—Fine-Tuning for Extreme Edge

Special treatment may be required for extreme edge—additional OCD measurements and or additional OCD recipe (finetuning) may be required to get best extreme edge description.

Imaging Metrology Measurements

For all wafers standard OCD recipe is measuring parameters of interest at a pre-defined location (12 to 100 points per wafer). Images are collected in the required conditions and processed. OCD results (all parameters of interest) image parameters at the same locations are used together to allow accurate image metrology at each wafer.

Interpretation of the image into parameter maps may be done in the multiple ways, including instant ML approach build on the profile parameters measured at one of the image locations (standard scatterometry) at the current wafer and/or at the specially prepared DOE wafers and/or on the prior knowledge about the wafer and its processing.

There may be provided an imaging device, that may include an imaging device that is configured to image a wafer, at a first spectral resolution, at a first throughput, and during a movement of the wafer between a metrology device and another device, wherein the first spectral resolution is coarser that a second spectral resolution of the metrology device, wherein the first throughput exceeds a second throughput of the metrology device; and a mechanical interface for mechanically coupling the imaging device to the metrology device.

The imaging device may be configured to measure features of the wafer.

The imaging device may include an illumination module that may be configured to scan the wafer with at least one illumination line during the movement of the wafer.

The imaging device comprises an illumination module that may be configured to scan the wafer with different illumination lines that differ from each other by illumination frequency, during the movement of the wafer, wherein the different illumination lines are formed on the wafer at different and non-overlapping illumination periods.

Each illumination line may be normal to a direction of the movement of the wafer.

The illumination may be normal to the wafer.

The imaging device may include a collection module that has an optical axis that may be normal to the wafer.

The illumination module may include an optical unit configured to convert an incoming radiation beam of a round cross section to line radiation.

Figure 17:
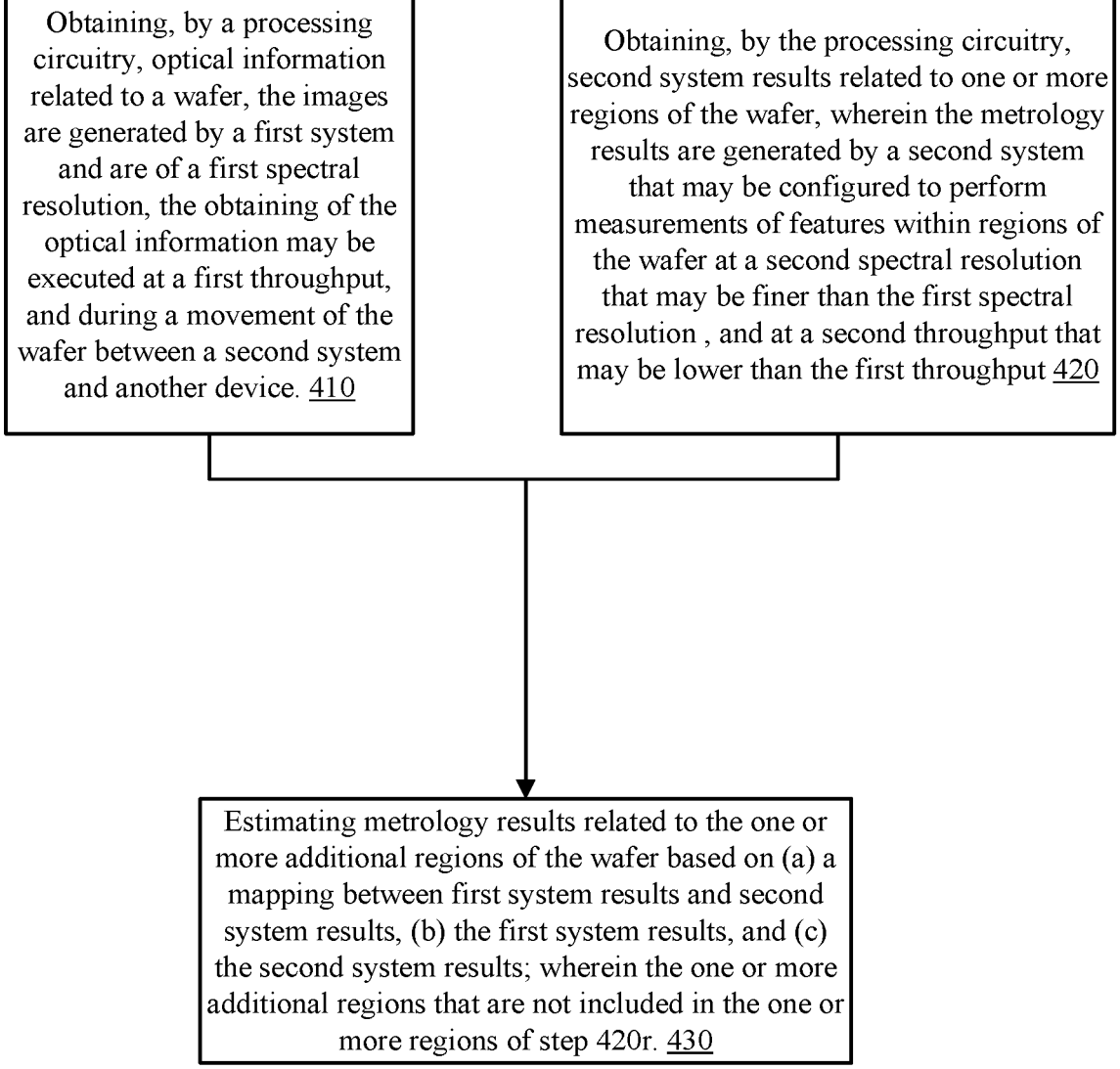
FIG. 17 illustrates method 300.

FIG. 17 illustrates method 300.

Method 300 may include step 310 of obtaining optical information, by first system, about a wafer at a first spectral resolution, at a first throughput, and during a movement of the wafer between a metrology device and another device, wherein the first spectral resolution is coarser than a second spectral resolution of a second system, wherein the first throughput exceeds a second throughput of the second system; wherein the first system is mechanically coupled, by a mechanical interface, to the second system. The first system may be an imaging or a non-imaging system. The second system may be a metrology device, an IM tool, and the like.

Step 310 may be followed by step 320 of measuring, by the first system, features of the wafer. These may be metrology parameters.

Step 310 may be executed during step 305 of scanning the wafer, by an illumination module of the first system, with at least one illumination line during the movement of the wafer. There may be multiple lines—but the number of lines is much smaller than a number of pixels per line. There may be between 5-10 lines, 10-20, lines, 20-40 lines, 15-50 lines and the like.

Step 305 may include scanning the wafer, by an illumination module of the first system, with different illumination lines that differ from each other by illumination frequency, during the movement of the wafer, wherein the different illumination lines are formed on the wafer at different and non-overlapping illumination periods.

Each illumination line may be normal to a direction of the movement of the wafer.

The illumination may be normal to the wafer.

The first system may include a collection module that has an optical axis that may be normal to the wafer.

Step 310 may include converting, by an optical unit of the first system, an incoming radiation beam of a round cross section to line radiation.

FIG. 18 illustrates method 400.

Method 400 may include step 410 of obtaining, by a processing circuitry, optical information related to a wafer, the images are generated by a first system and are of a first spectral resolution, the obtaining of the optical information may be executed at a first throughput, and during a movement of the wafer between a second system and another device.

Method 400 may also include step 420 of obtaining, by the processing circuitry, second system results related to one or more regions of the wafer, wherein the metrology results are generated by a second system that may be configured to perform measurements of features within regions of the wafer at a second spectral resolution that may be finer than the first spectral resolution, and at a second throughput that may be lower than the first throughput.

Steps 410 and 420 may be followed by step 430 of estimating metrology results related to the one or more additional regions of the wafer based on (a) a mapping between first system results and second system results, (b) the first system results, and (c) the second system results; wherein the one or more additional regions that are not included in the one or more regions of step 420.

This application provides a significant technical improvement over the prior art—especially an improvement in computer science.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. One or more systems for metrology, comprising:
a first system that is configured to:
illuminate areas of a sample by sets of pulses of different wavelengths that are spaced apart in time, during a movement of the sample between the first system and a second system, the movement exhibits speed variations;
collect light reflected from the illuminated areas to provide sets of frames, each set of frames comprises partially overlapping frames associated with the different wavelengths; wherein the speed variations introduce variations in overlaps between the partially overlapping frames; and
process the frames to provide optical metrology results indicative of one or more evaluated parameters of elements of the areas of the sample.

2. The one or more systems of claim 1, wherein first system is configured to provide the optical metrology results based on a mapping between the sets of frames and reference measurements obtained by an other optical metrology process that is applied by the second system and exhibits a higher spectral resolution than a spectral resolution obtained by the illuminating and the collecting applied by of the first system; wherein the other metrology process is an integrated metrology process executed by an integrated metrology tool.

3. The one or more systems of claim 1 wherein the different wavelengths are discrete wavelengths.

4. The one or more systems of claim 2 wherein the mapping is provided by a machine learning process.

5. The one or more systems of claim 4 wherein the machine learning process is trained by a training process that comprises feeding the machine learning process with (a) test measurements of one or more test samples that were obtained by the other optical metrology process and information, and (b) additional test measurements of the one or more test samples that were obtained by the method for optical metrology.

6. The one or more systems of claim 1 comprise a robot that wherein is configured to perform the movement of the sample between the first system and the second system, the robot differs from a stage configured to move the sample with a constant speed.

7. The one or more systems of claim 1 wherein the an first system is an integrated metrology tool and the second system comprises an Equipment Front End Module (EFEM).

8. The one or more systems of claim 1 wherein the different wavelengths are selected based on a model-based analysis of a sensitivity of the optical metrology process to changes in values of an evaluated parameter.

9. The one or more systems of claim 1 wherein the sample is a bare wafer and wherein the method comprises sensing locations of at least one portion of an edge of the bare wafer during the illuminating and collecting.

10. The one or more systems of claim 9 comprising determining locations of the areas based on the locations of the at least one portion of the edge.

11. The one or more systems of claim 10 wherein the processing comprises generating a map of the bare wafer at a certain wavelength of the different wavelengths, based on frames associated with the certain wavelength and the locations of the areas related to the frames.

12. The one or more systems of claim 1 wherein frames that are associated with a same wavelength belong to different sets of frames that partially overlap.

13. The one or more systems of claim 1 wherein the illuminating and collecting are executed while the sample is moved by a robot between an integrated metrology tool and an Equipment Front End Module (EFEM) of a processing tool.

14. The one or more systems of claim 1 wherein a number of different wavelengths ranges between 4 and 30.

15. The one or more systems of claim 1 wherein a number of different wavelengths ranges between 10 and 40.

16. The one or more systems of claim 1 wherein the other metrology process is spectral reflectometry.

17. The one or more systems of claim 1 wherein at least one of the illuminating or the collecting utilizes a contact image sensor (CIS).

18. The one or more systems of claim 1 wherein at least one of the illuminating or the collecting utilizes a telecentric objective.

19. The one or more systems of claim 1 wherein at least one of the illuminating or the collecting utilizes a non-telecentric objective.

* * * * *